US006905000B1

(12) United States Patent
Viveros

(10) Patent No.: US 6,905,000 B1
(45) Date of Patent: Jun. 14, 2005

(54) FACEPLATE COVER

(75) Inventor: Jacobo Torres Viveros, Tijuana (MX)

(73) Assignee: Plantronics, Inc., Santa Cruz, CA (US)

( * ) Notice: Subject to any disclaimer, the term of this patent is extended or adjusted under 35 U.S.C. 154(b) by 91 days.

(21) Appl. No.: 10/355,550

(22) Filed: Jan. 31, 2003

(51) Int. Cl.[7] .......................... H04R 25/02; B23K 1/06; B23K 5/20
(52) U.S. Cl. ...................... 181/129; 228/110.1; 228/1.1
(58) Field of Search ................................ 181/129, 130, 181/135; 228/110.1, 1.1; 381/325, 189, 391; 156/73.1, 580.1

(56) References Cited

U.S. PATENT DOCUMENTS

| | | | | | |
|---|---|---|---|---|---|
| 5,420,935 | A | * | 5/1995 | Shinohara et al. | 381/370 |
| 5,828,012 | A | * | 10/1998 | Repolle et al. | 181/175 |
| 6,018,585 | A | * | 1/2000 | Akino et al. | 381/355 |

FOREIGN PATENT DOCUMENTS

| | | | | | |
|---|---|---|---|---|---|
| DE | 3330471 | A1 * | 3/1985 | G10K/11/02 |
| DE | 3620889 | A1 * | 12/1987 | H04R/7/02 |
| JP | 61137493 | A * | 6/1986 | H04R/7/18 |
| JP | 02279098 | A * | 11/1990 | H04R/1/02 |
| JP | 06178392 | A * | 6/1994 | H04R/17/00 |

* cited by examiner

*Primary Examiner*—Edgardo San Martin
(74) *Attorney, Agent, or Firm*—Peter Hsieh

(57) ABSTRACT

The present invention provides an improved method and apparatus for manufacturing communication devices. A cover is attached to a surface of a faceplate that includes at least one opening, to provide enhanced device protection and sound quality. In one embodiment of the present invention, ultrasonic energy is used to cleanly and efficiently attach a cover to an inner surface of the faceplate. Advantageously, the present invention provides for improved manufacturing consistency and efficiency while also improving product quality.

38 Claims, 5 Drawing Sheets

Interior View

Interior View

Exterior View

Interior View

Exterior View

Interior View

Ultrasonic Process

Smaller dispersion using this process

Adhesive Process with Accelerator

3 STD out of specifications

FACEPLATE COVER

BACKGROUND OF THE INVENTION

1. Field of Invention

The present invention generally relates to communication devices. More particularly, the present invention relates to d method and apparatus for improved manufacturing of headsets, handsets, and mobile devices.

2. Discussion of the Related Art

Communication devices, such as headsets, handsets, and mobile phones, typically include a faceplate that is attached to a speaker or microphone housing. The faceplate usually includes openings to allow for greater transmission of sound while still protecting the speaker or microphone device within the housing. In the case involving a speaker housing, a faceplate allows for transmission of sound to the user's ear from the speaker device. In the case involving a microphone housing, a faceplate allows for transmission of sound from the user's mouth to the microphone device.

One method to modify and improve a communication headset, handset, or mobile phone is to change the shape, number, and/or size of the holes or openings in the faceplate. However, as the number and/or size of the openings in the faceplate increase, more contaminants and/or particulates are capable of entering into the interior of the speaker or microphone housing, possibly causing malfunction or degraded acoustic operation of the speaker and/or microphone device. Another disadvantage of having openings in the faceplate is that the user may have direct sight to the interior parts of the headset, handset, or mobile phone, which may not be aesthetically pleasing.

Therefore, what is needed is a method and apparatus to prevent entry of contaminants into the interior of a communication device, and to prevent direct sight into the interior of the communication device.

SUMMARY

The present invention provides a method and apparatus to attach a cover to a faceplate associated with a speaker or microphone housing, allowing for device protection and enhanced acoustic performance. An embodiment of the present invention provides for using ultrasonic energy to attach a cover to an interior surface of the faceplate.

According to one embodiment of the present invention, a method of manufacturing a communication device includes providing a faceplate including at least one opening, and providing a cover over the at least one opening. The cover is attached to a surface of the faceplate using ultrasonic energy.

According to another embodiment of the present invention, a method of manufacturing a communication device includes providing a faceplate including a plurality of openings, and providing a cover over the plurality of openings. The cover is attached to an inner surface of the faceplate along a perimeter of the cover using ultrasonic energy.

According to another embodiment of the present invention, a communication device is provided. The communication device includes a housing, and a faceplate operably coupled to the housing, wherein the faceplate includes at least one opening. A cover is provided over the at least one opening, wherein the cover is attached to an inner surface of the faceplate by ultrasonic energy.

By using ultrasonic energy, the present invention provides a manufacturing method and apparatus for communication devices that allow for several advantages, including manufacturing consistency and efficiency, enhanced sound quality, and improved design flexibility.

These and other features and advantages of the present invention will be more readily apparent from the detailed description of the embodiments set forth below taken in conjunction with the accompanying drawings.

BRIEF DESCRIPTION OF THE DRAWINGS

Use of the same reference symbols in different figures indicates similar or identical items. It is further noted that the drawings may not be drawn to scale.

DETAILED DESCRIPTION

Figure 1:
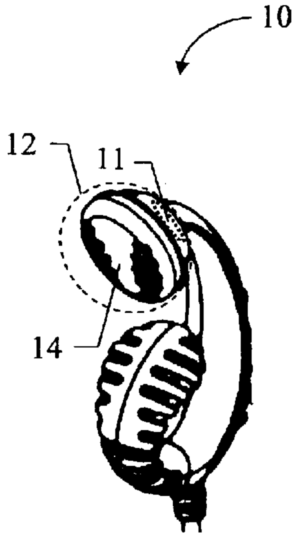
FIG. 1 illustrates a perspective view of an earphone headset.

One example of a headset 10 is illustrated in FIG. 1. Headset 10 is known as an "in-the-ear" or "earbud" type headset and includes an earphone capsule 12 (enclosed by dashed lines) for insertion into a recess of a headset user's ear, such as the cavum area, which leads to the ear canal. Earphone capsule 12 includes a faceplate 14 and encloses a transducer 11, such as an electro-acoustic speaker (outline shown by dashed lines).

Transducer 11 receives audio signals from an audio signal source and may comprise a known type of electromagnetic, piezoelectric, or electrostatic type of driving element, or a combination thereof, or even some other form of driving element, for generating sound waves from the output face of transducer 11 and toward faceplate 14.

Figure 2A:
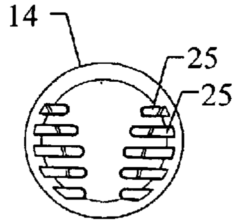
FIGS. 2A and 2B illustrate a front view of a headset faceplate and a perspective view of an inner surface of the headset faceplate including a cover, respectively, in accordance with an embodiment of the present invention.
Figure 2B:
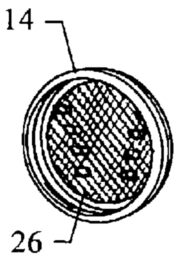

FIGS. 2A and 2B illustrate one example of faceplate 14. FIG. 2A illustrates a front view of an outer or exterior surface of faceplate 14 that is capable of contacting a user's ear. FIG. 2B illustrates a perspective view of an inner or interior surface of faceplate 14. The inner surface of faceplate 14 is the surface that is closer to transducer 11 and the surface to which a cover 26 may be attached, in accordance with one embodiment of the present invention.

In one embodiment, as shown in FIG. 2A, faceplate 14 includes openings 25 such that sound is directed from transducer 11 (FIG. 1) toward the user's eardrum, regardless of whether earphone capsule 12 (FIG. 1) is placed in the right ear or the left ear. In one example, faceplate 14 includes two sets of openings 25 aligned side by side from each other and increasing in separation moving vertically from the bottom of faceplate 14 towards the top of faceplate 14. Openings 25 direct sound from transducer 11 toward the user's eardrum at angles away from the center of faceplate 14. Accordingly, the set of openings 25 on the left side of faceplate 14 (in relation to the front of the faceplate) is able to direct sound toward the left and therefore the user's right eardrum and the set of openings 25 on the right side of faceplate 14 (in relation to the front of the faceplate) is able to direct sound toward the right and therefore the user's left eardrum. Thus, advantageously, sound is transmitted through faceplate 14 toward the user's eardrum regardless of whether speaker capsule 12 is placed in the right ear or the left ear.

Openings 25 are shaped as slots instead of the typical round holes found in conventional headsets or handsets. Openings 25 also may have a larger area than the typical round holes.

Therefore, in accordance with one embodiment of the present invention as shown in FIG. 2B, headset 10 includes a cover 26 attached to faceplate 14 to hinder contaminants from penetrating to the interior of earphone capsule 12 (FIG. 1). In one example, with no intent to limit the invention thereby, cover 26 is attached to an inner surface of faceplate 14, as shown in FIG. 2B. Cover 26 also prevents direct sight into the inner parts of the headset. In one embodiment, cover 26 may also be used as an acoustic resistor or attenuator in conjunction with a speaker and/or microphone. In one example, with no intent to limit the invention thereby, cover 26 is a cloth or mesh material that can be attached to the inner surface of a faceplate associated with a headset, handset, or mobile phone. It should be understood that various materials may be utilized for cover 26 that allow for transmission of sound while hindering the passage of contaminants. In a further example, with no intent to limit the invention thereby, the diameter of cover 26 is between about 12 mm and about 14 mm, preferably about 13.6 mm.

Though the above example describes a headset, as illustrated in FIG. 1, it should be understood that the present invention is not limited to a headset but may also be used with handsets, mobile phones, or other devices including a faceplate operating in conjunction with a speaker and/or microphone.

It should also be understood that the invention is not limited to a specific faceplate but any appropriate faceplate with openings may be used in accordance with the present invention. In one example, with no intent to limit the invention thereby, the diameter of the faceplate is between about 12 mm and about 14 mm. In one example, with no intent to limit the invention thereby, the present invention can be used for MX-100 earphone headsets available from Plantronics, Inc., of Santa Cruz, Calif.

Several methods have been tried to attach cover 26 to the inner surface of a faceplate, including the use of: (1) an adhesive; (2) an adhesive and accelerator; and (3) a self-adhesive cover. All of these methods have disadvantages.

Method 1: Adhesive

A cover may be attached to a faceplate by using an appropriate adhesive between the cover and the faceplate to join the elements together. However, there are disadvantages associated with this method.

First, the use of an adhesive increases the overall cost of the product.

Second, the use of an adhesive is not a "clean" process. Typically, a dispenser system is used and requires intensive maintenance service. Also, the adhesive may flow through the cover and could coat the holes of the faceplate, causing cosmetic rejects and/or changing the acoustic performance of the headset.

Figure 3:
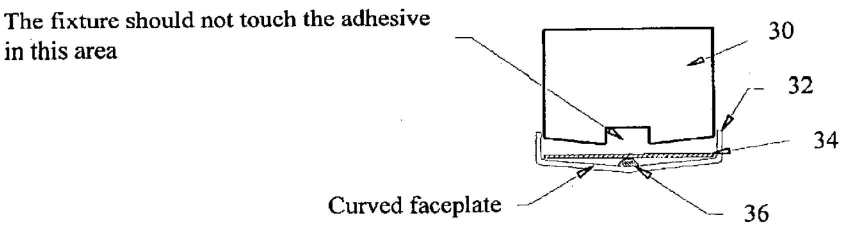
FIG. 3 illustrates the use of a fixture to attach a cover to a faceplate.

Referring now to FIG. 3, a further disadvantage of using an adhesive is illustrated. If a faceplate 32 is not flat, it may be necessary to use a fixture 30 to force a cover 34 to match the shape of faceplate 32. In this case, fixture 30 should not touch adhesive 36; otherwise, cover 34 could stick to fixture 30 instead of faceplate 32. Therefore, the use of a fixture will reduce the area where adhesive can be applied to the cover and can result in a less secure attachment of the cover to the faceplate.

It may also be required that the fixture press the cover to the faceplate for a period of time until the adhesive cures. Otherwise, the cover may return to its original shape. This period of time will depend on the shape of the faceplate, the flexibility of the cover, and the curing time of the adhesive. This wait period will increase the cost of the process.

Figure 4:
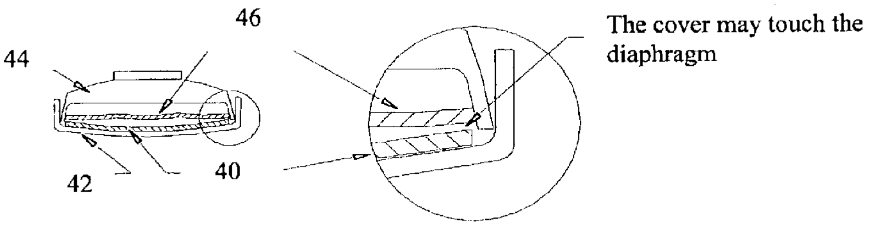
FIG. 4 illustrates a potential disadvantage of an insufficiently attached cover.

There is also a tendency to make communications headsets and mobile phones as small as possible. As shown in FIG. 4, when a telephone is small, it is likely that a transducer 44 is very close to a faceplate 42 and hence very close to a cover 40. In this case, if the entire area of cover 40 is not adhered to faceplate 42, such as when a fixture is used, part of cover 40 is still free to move. Thus, cover 40 could touch a transducer diaphragm 46 causing poor performance of the headset or mobile phone.

Accordingly, when a cover is not adhered to the faceplate in a secure and/or clean manner, the communication device could experience inconsistent and/or degraded acoustic performance.

Method 2: Adhesive and Accelerator

Figure 5:
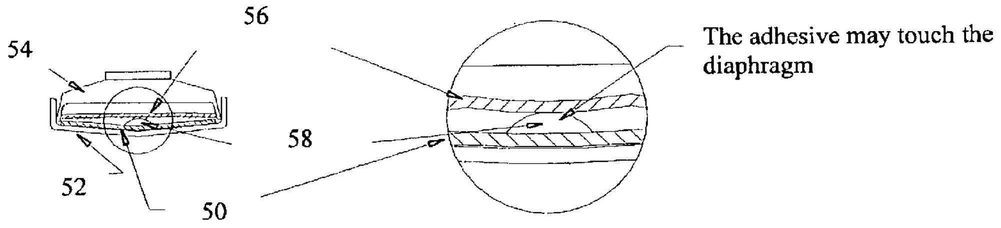
FIG. 5 illustrates a potential disadvantage of attaching a cover with adhesive or adhesive and accelerator.

Referring now to FIG. 5, a cover 50 may also be attached to a faceplate 52 using an adhesive in conjunction with an accelerator to reduce curing time. However, this method also involves disadvantages.

First, the use of another substance (the accelerator) increases the overall cost of the product. Additional dispensing equipment is necessary, as well as maintenance for the equipment.

Second, the use of another substance makes the attaching process less clean. This increases the risk of producing cosmetic rejects in the product.

Frequently, when the accelerator is applied, there is a tendency for the adhesive mix to bubble. As shown in FIG. 5, a bubble of adhesive mix 58 may touch a transducer diaphragm 56 if a transducer 54 is too close to cover 50, thereby causing poor or inconsistent acoustic performance.

Method 3: Self-adhesive Material

A third method to attach a cover to a faceplate is the use of an adhesive material to form a self-adhesive cover, similar to a label application. This process is fast and the entire area of the cover can be adhered to the faceplate. However, a disadvantage of using a self-adhesive cover is that a portion of the adhesive material on the cover is exposed through the faceplate openings, allowing for the accumulation of dust or other contaminants on the cover in the area of the faceplate openings. The contaminants accumulated on the cover could modify the acoustic performance of the headset.

Figure 6A:
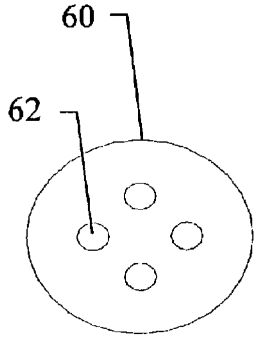
FIGS. 6A and 6B illustrate a front exterior view and a back interior view, respectively, of an adhesive-free weld of a cover to a faceplate, in accordance with an embodiment of the present invention.
Figure 6B:
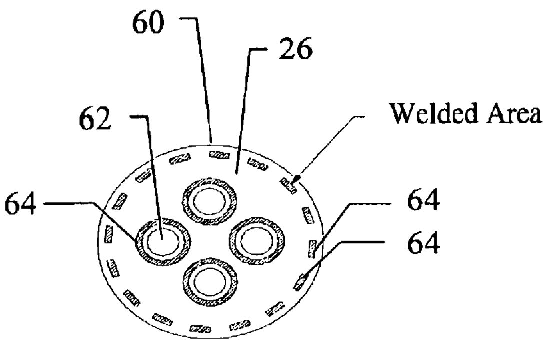

According to one aspect of the present invention, the cover is attached to a faceplate using ultrasonic energy. Referring now to FIGS. 6A and 6B, a front view and a back view are illustrated, respectively, of one example of a faceplate 60 including openings 62 and a cover 26 that can be attached to faceplate 60 in accordance with the present invention.

Cover 26 is attached to faceplate 60 along hashed areas 64 using ultrasonic energy, in accordance with one embodiment of the present invention.

In one example, ultrasonic energy may be used in an ultrasonic welding process or an ultrasonic spot welding process. These processes involve melting a thermoplastic cover to a thermoplastic faceplate, in one example, to keep the two parts together with a strong bond.

Ultrasonic welding involves the conversion of high-frequency electrical energy to high-frequency mechanical energy, accomplished in one example through an ultrasonic welding device. This mechanical energy is a vertical vibrating motion, usually set at a frequency between about 10 kHz and about 70 kHz, and transferred to a thermoplastic material under pressure. Frictional heat is generated at the interface, or joints, of two pieces of thermoplastic or a metal and thermoplastic to soften or melt the thermoplastic at the joint and form a bond. The ability to weld a component successfully is governed by the design of the welding device, the mechanical properties of the material to be welded, and the design of the parts to be welded.

In one example, an ultrasonic welding device includes five main components: a power supply, a converter, an amplitude modifying device (commonly called a booster), an acoustic tool known as a horn (or sonotrode), and a fixture. The power supply converts standard alternating current at frequencies between 50 and 60 Hz into high frequency electrical supply operating at ultrasonic frequencies of 20, 30, or 40 kHz.

The alternating current is supplied to the converter, which typically includes discs of piezoelectric material sandwiched between two metal sections. These discs are clamped tightly together and are always held in compression. The converter changes the alternating current into vertical, mechanical motion at ultrasonic frequencies equal to the supplied alternating current, namely 20,000, 30,000, or 40,000 vertical cycles per second.

The vertical mechanical motion is then transmitted through a booster which can increase or decrease the amplitude of the vibrating motion, depending on the needs of the application. The mechanical motion is then passed to a horn which transfers the mechanical energy to the parts that are being welded and also applies a welding pressure.

The parts that are being welded are secured in a fixture which holds the parts in place and square to the horn. The vibrations are transmitted through the parts and to the joint area where the mechanical energy is converted to heat by absorption of mechanical vibrations, the reflection of the vibrations in the welding area, and the friction between the surfaces of the parts. The heat softens or melts the thermoplastic and when ultrasonic vibrations are stopped, the molten material solidifies and a weld is achieved, joining the parts together.

Besides thermoplastic welding, ultrasonic energy can be used to rivet working parts or embed metal parts into plastic in processes such as ultrasonic staking and inserting. Thus, it should be understood that in accordance with the present invention, ultrasonic energy may be used in various joining methods to attach a cover to the inside surface of the faceplate.

Variables in amplitude, time, pressure, horn design, fixture design, and joint design need to be considered in order to achieve successful plastic welding. Amplitude is the vertical, vibratory, peak-to-peak movement produced by the converter, modified by the booster, and fine-tuned by the horn. This vertical motion is usually between 20 to 100 microns. Time is in reference to weld time and hold time.

Weld time is the amount of time, usually measured in tenths of seconds, that amplitude and pressure are applied to thermoplastic in order to get a desired weld. Hold time refers to the amount of time that pressure is held on the thermoplastic parts after ultrasonic energy has been terminated to assure that the melted plastic has solidified. As a general rule, hold times are usually half the weld time. Pressure refers to the force being applied to an area of the thermoplastic parts or metal inserts for the ultrasonic process.

In accordance with one embodiment of the present invention, with no intent to limit the invention thereby, an ultrasonic weld of the cover to the faceplate utilizes an amplitude between about 40 $\mu$m and about 120 $\mu$m, a weld time between about 0.3 second and about 1 second, a hold time between about 0.1 second and about 0.6 second, and/or air pressure between about 15 psi and about 40 psi. However, it should be understood that the aforementioned variables of amplitude, time, and pressure will vary depending on the application and ultrasonic welding device.

The use of ultrasonic energy to attach a cover to a faceplate coupled to a speaker or microphone housing provides several advantages. The cover can be melted to the faceplate in several points or lines, closely matching the geometry of the faceplate openings. This allows for the design of communication device faceplates with larger openings and greater design flexibility. The use of ultrasonic energy is particularly advantageous for covers having small diameters (e.g., between about 12 mm and about 14 mm) for use with small devices such as with headsets and mobile phones having small faceplate diameters (e.g., between about 12 mm and about 14 mm).

The use of an ultrasonic welding process allows for joining the cover to the faceplate in virtually any desired pattern. In one example, the welding area (where the cover is welded to the faceplate) can outline a perimeter of the geometric shape of the openings in the faceplate. As illustrated in FIG. 6B, the ultrasonic welding area, as shown by annular hashed areas 64, outlines all openings 62 in faceplate 60. Furthermore, cover 26 is welded with a stitch pattern, as shown by segmented hashed areas 64, substantially parallel to the perimeter or circumference of cover 26. It should be understood that alternatively, a continuous weld area substantially parallel to the perimeter or circumference of cover 26 and/or a stitch pattern substantially parallel to openings 62 could be used.

In this example, openings 62 are circular. However, it should be understood that openings 62 may be formed to have various geometric shapes and that the welding area preferably outlines the openings but may also be designed to securely attach the cover to the faceplate without welding an outline of all openings 62.

Figure 7A:
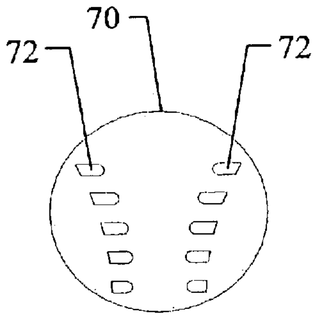
FIGS. 7A and 7B illustrate a front exterior view and a back interior view, respectively, of an adhesive-free weld of a cover to another faceplate, in accordance with an embodiment of the present invention.
Figure 7B:
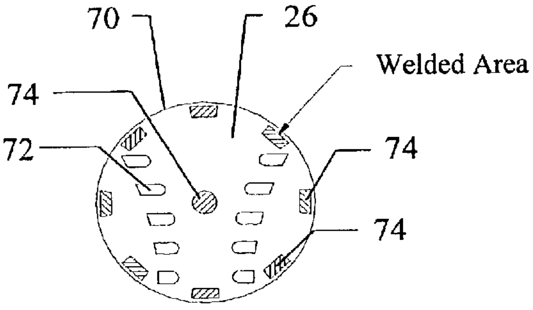

In another example, as shown in FIGS. 7A and 7B, the ultrasonic welding area, as shown by hashed areas 74, again outlines a stitch pattern around openings 72 of cover 26, substantially parallel to the perimeter or circumference of cover 26. A circular weld area is also made at the center of cover 26 between the two sets of openings 72. Again, it should be understood that, alternatively, a continuous weld area substantially parallel to the perimeter or circumference of cover 26 and/or a weld area (either continuous or in a stitch pattern) substantially parallel to openings 72 could be used.

Advantageously, a cover may be welded in any desired pattern that effectively and securely attaches the cover to the faceplate to prevent the cover from touching the transducer diaphragm or microphone device and to also prevent dust and other particulates from entering the headset capsule.

Figure 8A:
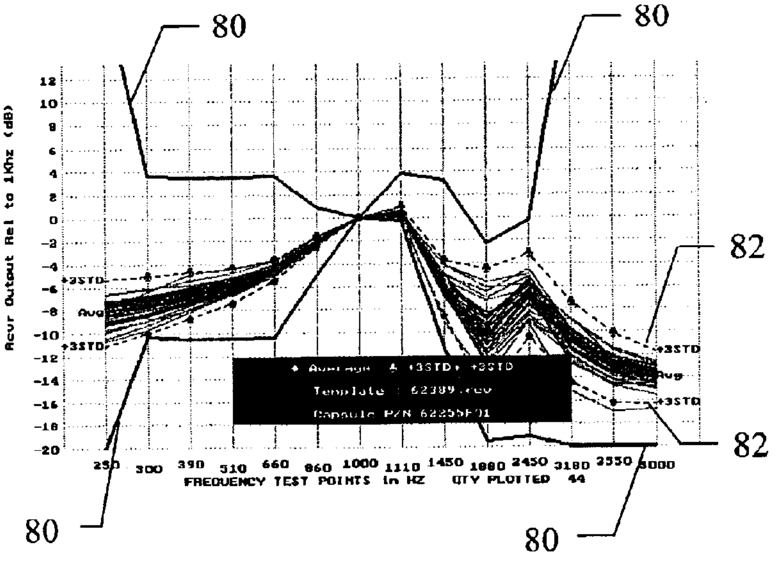
FIGS. 8A and 8B illustrate acoustic response using an ultrasonic energy method and an adhesive method, respectively.
Figure 8B:
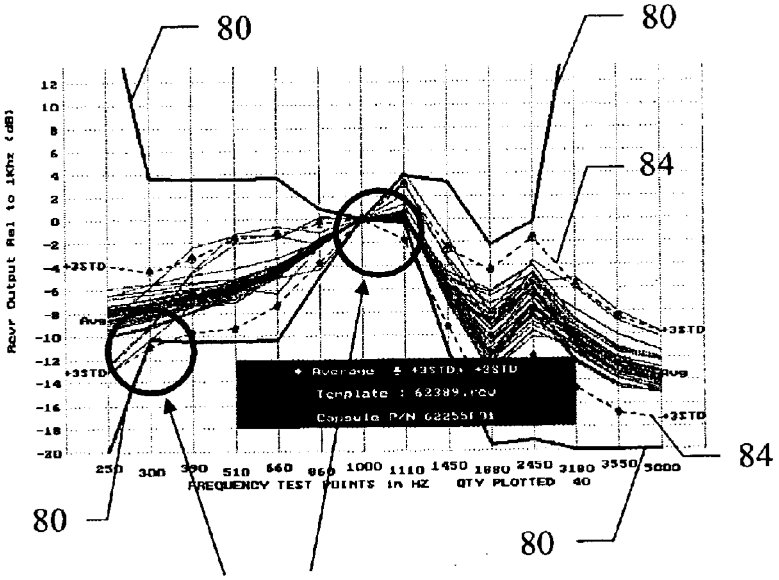

The present invention also provides for acoustically consistent headsets, handsets, and mobile phones. Referring to FIGS. 8A and 8B, the graphs show the frequency response of 44 units of an earphone headset manufactured using an ultrasonic welding process and 40 units of the earphone headset manufactured using an adhesive and accelerator process, respectively. The frequency response of the earphone headsets are graphed along the Y-axis at various frequencies along the X-axis. Specification boundary lines 80 in both graphs show the frequency response required for compliance with specifications for the device. Standard deviation lines 82 and 84 (illustrated by dashed lines) show three standard deviations from the mean of the frequency responses.

Standard deviation lines 82 (FIG. 8A) are smoother and form a narrower band as compared to standard deviation lines 84 (FIG. 8B). Thus, the earphone headsets manufactured using the ultrasonic process show a smaller dispersion of the headset frequency response than those headsets manufactured using the adhesive and accelerator process. Accordingly, the ultrasonic process provides for more consistent acoustic performance after attaching a cover to a faceplate. Therefore, the use of ultrasonic energy, in accordance with one embodiment of the present invention, will reduce the quantity of rejects during the testing process and improve product quality.

Furthermore, the ultrasonic process is quick (0.1 to 1 sec) and easily automated, reducing the cost of labor. This is a clean process, producing fewer cosmetic rejects and requiring less maintenance of equipment. The ultrasonic process is safer as well, not only for the assembly worker since fumes from an adhesive are avoided, but for the environment since excess or spent adhesive need not be disposed of.

Advantageously, attaching a cover to a faceplate, in accordance with the present invention, allows for communication device protection, enhanced sound quality, and faceplate design flexibility. Furthermore, the present invention provides for permanent attachment of the cover to the faceplate with minimal process cycle time, thereby reducing labor costs, and with an adhesive-free process, thereby reducing potential cosmetic and acoustic defects.

Figure 9:
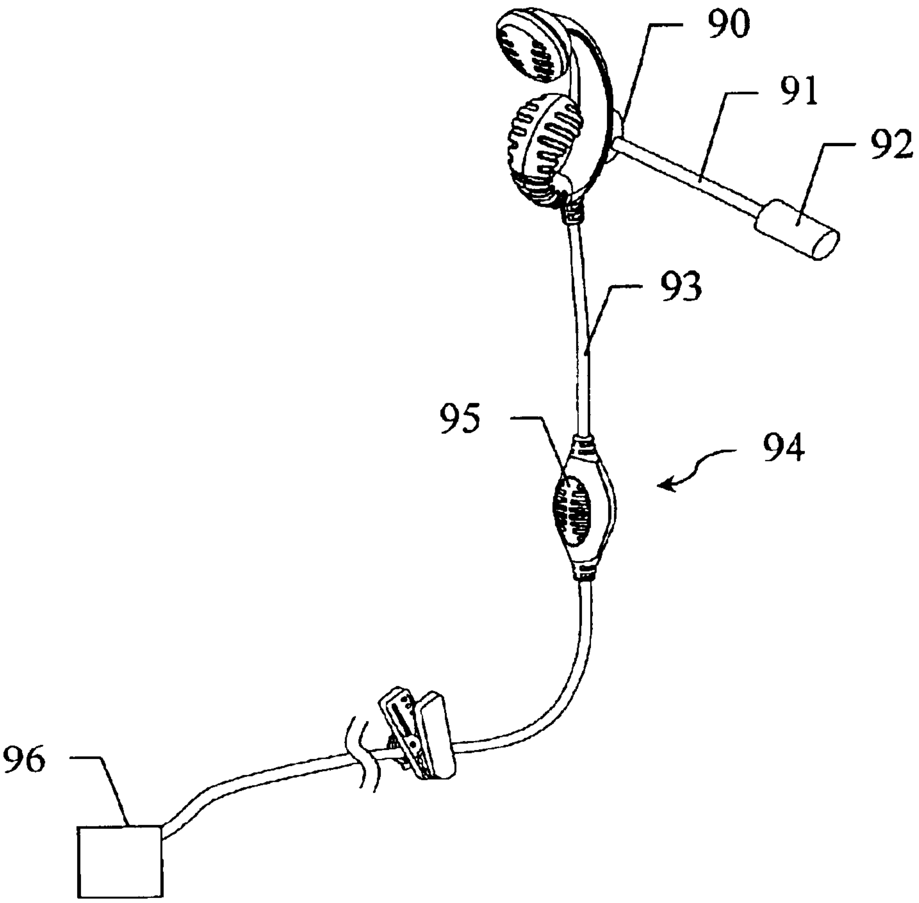
FIG. 9 illustrates microphone faceplates in which the present invention may be used.

As will be apparent to those of ordinary skill in the art, the present invention may be used not only for earphone capsules but for microphones with faceplates to enable two-way voice communication by the user. As shown in FIG. 9, in one embodiment, a microphone may be operably enclosed in a pod 94 in-line with a speaker cable 93, which holds wires for operably connecting the transducer to an audio source 96. Microphone faceplate 95 provides an opening on one side of pod 94 to allow the user to transmit voice signals as desired.

In another embodiment, a microphone inside a microphone housing 92 may be attached to a boom 91, which is operably connected to the earphone headset. Optionally, a movable joint 90, such as a swinging mechanism, may couple boom 91 to the earphone headset, such that boom 91 may swing back and forth to the user's mouth and lock into a position as desired by the user. The present invention may be utilized with microphone faceplate 95 and/or microphone housing 92 to provide device protection and improved sound quality.

The above-described embodiments of the present invention are merely meant to be illustrative and not limiting. Various changes and modifications may be made within the scope of this invention. Therefore, the appended claims encompass all such changes and modifications.

What is claimed is:

1. A method of manufacturing an acoustic device, comprising:

providing a faceplate including at least one opening for acoustic communication;

providing a cover over the at least one opening; and attaching the cover to an inner surface and center area of the faceplate using ultrasonic energy.

2. The method of claim 1, wherein the faceplate is comprised of a thermoplastic material.

3. The method of claim 1, further comprising operably coupling the faceplate to a housing including a speaker or a microphone.

4. The method of claim 1, wherein the at least one opening has a geometric shape.

5. The method of claim 1, wherein the at least one opening is shaped as a slot or a circle.

6. The method of claim 1, wherein the cover is comprised of a thermoplastic material.

7. The method of claim 1, wherein the cover is a cloth.

8. The method of claim 1, wherein the cover is a mesh material.

9. The method of claim 1, wherein the attaching of the cover is performed by ultrasonic welding.

10. The method of claim 9, wherein the ultrasonic welding is performed for between about 0.3 second and about 1.0 second.

11. The method of claim 9, wherein the ultrasonic welding is performed with a hold time between about 0.1 second and about 0.6 second.

12. The method of claim 9, wherein the ultrasonic welding is performed at a pressure between about 15 psi and about 40 psi.

13. The method of claim 9, wherein the ultrasonic welding is performed with an amplitude between about 40 $\mu$m and about 120 $\mu$m.

14. The method of claim 1, wherein the cover is attached to an inner surface of the faceplate.

15. The method of claim 1, wherein the cover is attached to the faceplate along a perimeter of the cover.

16. The method of claim 1, wherein the cover is attached to the faceplate using a stitch pattern substantially parallel to the perimeter of the cover.

17. The method of claim 1, wherein the cover is attached to the faceplate substantially parallel to a perimeter of the at least one opening.

18. The method of claim 1, wherein the cover is attached to the faceplate using a stitch pattern substantially parallel to the perimeter of the at least one opening.

19. A method of manufacturing an acoustic device, comprising:

providing a faceplate including a plurality of openings for acoustic communication, the faceplate having a diameter between about 12 mm and about 14 mm;

providing a cover over the plurality of openings; and attaching the cover to an inner surface and center area of the faceplate using ultrasonic energy.

20. The method of claim 19, wherein the plurality of openings have different geometric shapes.

21. The method of claim 19, wherein the faceplate and the cover are comprised of thermoplastic material.

22. The method of claim 19, wherein the attaching of the cover is performed by ultrasonic welding.

23. The method of claim 22, wherein the ultrasonic welding is performed for between about 0.3 second and about 1 second at a pressure between about 15 psi and about 40 psi and at an amplitude between about 40 $\mu$m and about 120 $\mu$m with a hold time between about 0.1 second and about 0.6 second.

24. The method of claim 19, wherein the cover is attached to the faceplate using a stitch pattern substantially parallel to the perimeter of the cover.

25. The method of claim 19, wherein the cover is attached to the faceplate substantially parallel to a perimeter of each of the plurality of openings.

26. The method of claim 19, wherein the cover is attached to the faceplate using a stitch pattern substantially parallel to the perimeter of each of the plurality of openings.

27. An acoustic device, comprising:

a housing;

a faceplate coupled to the housing, wherein the faceplate includes at least one opening for acoustic communication; and a cover over the at least one opening, wherein the cover is attached to an inner surface and center area of the faceplate by ultrasonic energy.

28. The device of claim 27, wherein the faceplate has a diameter between about 12 mm and about 14 mm.

29. The device of claim 27, wherein the faceplate and the cover are comprised of thermoplastic material.

30. The device of claim 27, further comprising a speaker or microphone contained within the housing, wherein the faceplate covers the speaker or microphone.

31. The device of claim 27, wherein the cover has a diameter between about 12 mm and about 14 mm.

32. The device of claim 27, wherein the cover is attached by ultrasonic welding.

33. The device of claim 32, wherein the ultrasonic welding is performed for between about 0.3 second and about 1 second at a pressure between about 15 psi and about 40 psi and at an amplitude between about 40 $\mu$m and about 120 $\mu$m with a hold time between about 0.1 second and about 0.6 second.

34. The device of claim 27, wherein the cover is attached to the faceplate along a perimeter of the cover.

35. The device of claim 27, wherein the cover is attached to the faceplate using a stitch pattern substantially parallel to the perimeter of the cover.

36. The device of claim 27, wherein the cover is attached to the faceplate substantially parallel to a perimeter of the at least one opening.

37. The device of claim 27, wherein the cover is attached to the faceplate using a stitch pattern substantially parallel to the perimeter of the at least one opening.

38. An acoustic device, comprising:

a housing;

a faceplate coupled to the housing, wherein the faceplate includes at least one opening for acoustic communication, and further wherein the faceplate has a diameter between about 12 mm and about 14 mm; and a cover over the at least one opening, wherein the cover is attached to an inner surface and center area of the faceplate by ultrasonic energy.

* * * * *